United States Patent
Tamashiro et al.

(10) Patent No.: US 12,117,422 B2
(45) Date of Patent: Oct. 15, 2024

(54) METHOD FOR IDENTIFYING NECKING LIMIT STRAIN OF METAL SHEET

(71) Applicant: JFE STEEL CORPORATION, Tokyo (JP)

(72) Inventors: Fumiaki Tamashiro, Tokyo (JP); Satoshi Sumikawa, Tokyo (JP); Masaki Urabe, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 250 days.

(21) Appl. No.: 17/916,698

(22) PCT Filed: Dec. 1, 2020

(86) PCT No.: PCT/JP2020/044709
§ 371 (c)(1),
(2) Date: Oct. 3, 2022

(87) PCT Pub. No.: WO2021/205693
PCT Pub. Date: Oct. 14, 2021

(65) Prior Publication Data
US 2023/0152195 A1 May 18, 2023

(30) Foreign Application Priority Data

Apr. 7, 2020 (JP) .................................. 2020-068751

(51) Int. Cl.
*G01N 3/08* (2006.01)
*B21C 51/00* (2006.01)
*G01N 3/28* (2006.01)

(52) U.S. Cl.
CPC ............... *G01N 3/08* (2013.01); *B21C 51/00* (2013.01); *G01N 3/28* (2013.01)

(58) Field of Classification Search
CPC ............. G01N 3/08; G01N 3/28; B21C 51/00
See application file for complete search history.

(56) References Cited

U.S. PATENT DOCUMENTS

2007/0151359 A1* 7/2007 Broadley ............... G01N 3/068
73/826
2009/0177417 A1* 7/2009 Yonemura ............... G06F 30/15
702/42
(Continued)

FOREIGN PATENT DOCUMENTS

JP  2009162545 A  *  7/2009
JP  2011-140046 A     7/2011
(Continued)

OTHER PUBLICATIONS

Hatami, M.K. et al., "Towards ultra-high ductility TRIP-assisted multiphase steels controlled by strain gradient plasticity effect," Journal of the Mechanics and Physics of Solids, vol. 98, pp. 201-221, 2017.
(Continued)

*Primary Examiner* — Herbert K Roberts
(74) *Attorney, Agent, or Firm* — Oliff PLC

(57) ABSTRACT

A method for identifying a necking limit strain of a metal sheet includes a step of measuring the distribution of strain in a tensile orthogonal direction in a tensile deformation process of a notch root for two or more types of sheet specimens having a notch geometry in a portion of a sheet edge; a step of obtaining a strain increment ratio of the notch root in the tensile deformation process and a strain gradient in the tensile orthogonal direction; a step of obtaining necking limit strain at which necking occurs in the notch root based on the strain increment ratio in the tensile deformation process; and a step of identifying the necking limit strain as a function of the strain gradient from the relation between the necking limit strain obtained for the two or more types of sheet specimens and the strain gradient at that time.

4 Claims, 11 Drawing Sheets

(56) References Cited

U.S. PATENT DOCUMENTS

2015/0294043 A1* 10/2015 Sonobe .............. G01M 99/007
    703/2
2018/0107772 A1* 4/2018 Shirakami .............. B21D 22/00

FOREIGN PATENT DOCUMENTS

| JP | 2014-115269 A | 6/2014 |
| JP | 2019-118958 A | 7/2019 |
| JP | 2020-046184 A | 3/2020 |

OTHER PUBLICATIONS

Lim, S.J. et al., "Fracture Loci of DP980 Steel Sheet for Auto-Body at Intermediate Stain Rates," International Journal of Automotive Technology, vol. 18, No. 4, pp. 719-727, 2017.
Aug. 24, 2023 extended Search Report issued in European Patent Application No. 20930236.3.
Feb. 16, 2021 International Search Report issued in International Patent Application No. PCT/JP2020/044709.

* cited by examiner

FIG.3
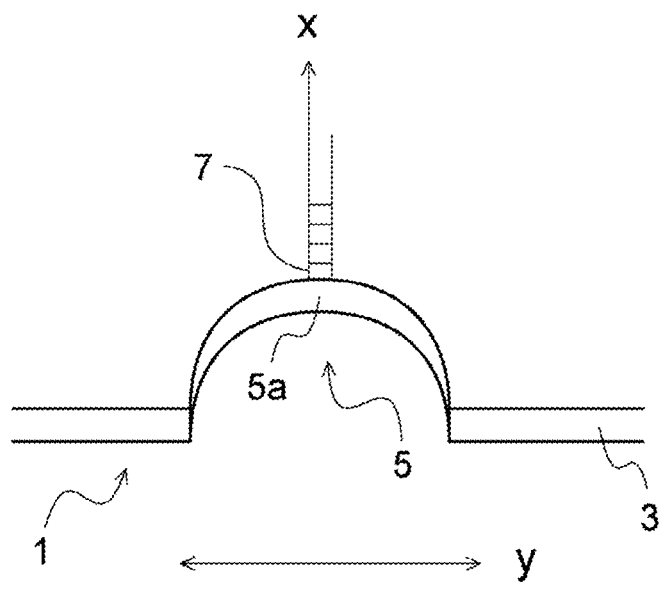
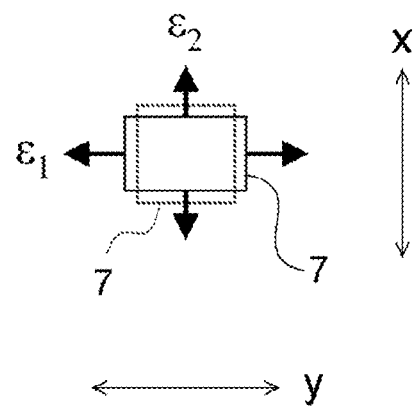
(a)   (b)

METHOD FOR IDENTIFYING NECKING LIMIT STRAIN OF METAL SHEET

FIELD

The present invention relates to a method for identifying a necking limit strain of a metal sheet, and in particular, a method for identifying a necking limit strain of a metal sheet that identifies the relation between the necking limit strain, which is the strain at the time of occurrence of necking by imparting tensile deformation to the sheet edge of the metal sheet, and the strain gradient.

BACKGROUND

Press forming products (for example, automotive parts and automotive body components) are mass-produced by press forming using tools of press forming. In such press forming, the stretch flanging of a blank (metal sheet) is often accompanied. In press forming accompanied with stretch flanging, depending on the forming specifications (shape of press forming product, tool shape of press forming, and the like), the sheet edges of the blank may reach a fracture limit during the press forming and may fracture, which causes a problem. Thus, there is a need to make a judgement in advance whether the stretch flanging will reach the fracture limit during the press forming before the fracture occurs. However, a deformation behavior of the sheet edge of the blank due to stretch flanging differs for each part of a press formed part and is unable to be specified uniformly. Therefore, in predicting the fracture limit before leading to the fracture, a unified index that can be applied to any type of deformation behavior is needed.

Conventionally, as methods for obtaining indexes that allow the fracture limit to be predicted in stretch flanging, there have been methods that combine material test and analysis by a finite element method (FEM analysis), and as such methods, Patent Literature 1 and Patent Literature 2 have been disclosed, for example. The method disclosed in Patent Literature 1 performs a hole expansion test in which stretch flanging limit strain at the sheared edge of a metal material is obtained by changing an initial hole diameter and the shape of a hole expanding puncher and the FEM analysis in which the fracture limit strain of the hole edge (stretch flanging limit strain) and the strain gradients in the radial direction of the hole edge and thickness direction are calculated. Then, the method disclosed in Patent Literature 1 identifies the stretch flanging limit strain from the relation between the stretch flanging limit strain obtained from the hole expansion test and the strain gradients calculated by the FEM analysis and uses this as an index of the fracture limit.

Meanwhile, the method disclosed in Patent Literature 2 performs a side bending test on sheet specimens on which an arcuate shape of a different curvature is formed at the sheet end portion, and from the relation among the fracture strain at the fracture portion, the strain gradients in the arcuate radial direction and tangential direction, and the strain concentration, and identifies the fracture strain that occurs at the flange portion when stretch flanging is performed.

CITATION LIST

Patent Literature

[Patent Literature 1] Japanese Patent Application Laid-open No. 2014-115269

[Patent Literature 2] Japanese Patent Application Laid-open No. 2011-140046

SUMMARY

Technical Problem

When a metal sheet is deformed in press forming, plastic deformation progresses, and if the deformation concentrates at a specific sheet edge of the metal sheet, necking occurs, and then a fracture occurs in an early stage at the site where the necking occurred. Because there are variations due to disturbance in a mass production stage of press forming products, if the necking occurs during press trials, there is a high possibility that fracture will occur in the mass-produced products due to the variations caused by the disturbance. Even if no fracture has occurred, the occurrence of necking is judged as a defect of press forming.

In the conventional press forming feasibility judgement methods disclosed in the foregoing Patent Literature 1 and Patent Literature 2, the presence or absence of the occurrence of fracture predicted using the strain or strain gradient at the time the fracture occurred in the press forming process is used as an index and the judgement of press forming feasibility is made. However, in such methods, even if necking has occurred in the press forming process, it is judged that press forming is feasible with the presence or absence of the occurrence of fracture as an index. Therefore, it is different from the judgement criteria of press forming feasibility of press forming products in the mass production stage, and it is not possible to predict the necking before leading to the fracture.

The present invention has been made in view of the above-described problems, and an object of the present invention is to provide a method for identifying a necking limit strain of a metal sheet that is capable of identifying the necking limit strain easily and accurately when the necking occurs at the sheet edge of the metal sheet in press forming accompanied with stretch flanging and capable of predicting the occurrence of fracture in advance in mass production.

Solution to Problem

A method for identifying a necking limit strain of a metal sheet according to the present invention identifies a relation between a necking limit strain, at which necking occurs at a sheet edge of a metal sheet by imparting tensile deformation, and a strain gradient, and includes: a strain distribution measurement step of measuring, for two or more types of sheet specimens having a notch geometry for which a portion of a sheet edge is notched inward and having a different strain gradient in a tensile orthogonal direction that is orthogonal to a tensile direction when tensile deformation is imparted to a notch root of the notch geometry, distribution of strain of the notch root in the tensile orthogonal direction in a tensile deformation process; a strain increment ratio/strain gradient acquisition step of obtaining, for each of the sheet specimens, a strain increment ratio of the notch root in the tensile deformation process and a strain gradient in the tensile orthogonal direction, from the distribution of the strain in the tensile orthogonal direction measured at the strain distribution measurement step; a necking limit strain acquisition step of obtaining, for each of the sheet specimens, a necking limit strain that is a strain at a time of occurrence of necking in the notch root based on the strain increment ratio in the tensile deformation process obtained at the strain increment ratio/strain gradient acquisition step;

and a necking limit strain identification step of identifying the necking limit strain as a function of the strain gradient from a relation between the necking limit strain obtained for each of the sheet specimens and the strain gradient at a time of the necking limit strain out of the strain gradients in the tensile deformation process obtained at the strain increment ratio/strain gradient acquisition step.

The strain distribution measurement step may impart tensile deformation to the notch root by applying a tensile load in a uniaxial direction to the sheet specimen.

The strain distribution measurement step may measure the distribution of the strain in the tensile orthogonal direction by an image correlation method.

Advantageous Effects of Invention

According to the present invention, it is possible to identify the necking limit strain easily and accurately when necking occurred at the sheet edge of a metal sheet in press forming accompanied with stretch flanging. Moreover, according to the present invention, by the press forming simulation, it is possible to accurately predict the occurrence of necking before leading to the fracture in the press forming process of press forming products accompanied with stretch flanging and to prevent the fracture of the press forming products caused by disturbances in the mass production stage.

BRIEF DESCRIPTION OF DRAWINGS

FIG. 3 is a diagram explaining the strain to be measured by the sheet specimen used in the embodiment of the present invention ((a) an enlarged view of a notch geometry, (b) maximum principal strain and minimum principal strain).

DESCRIPTION OF EMBODIMENTS

Figure 1:
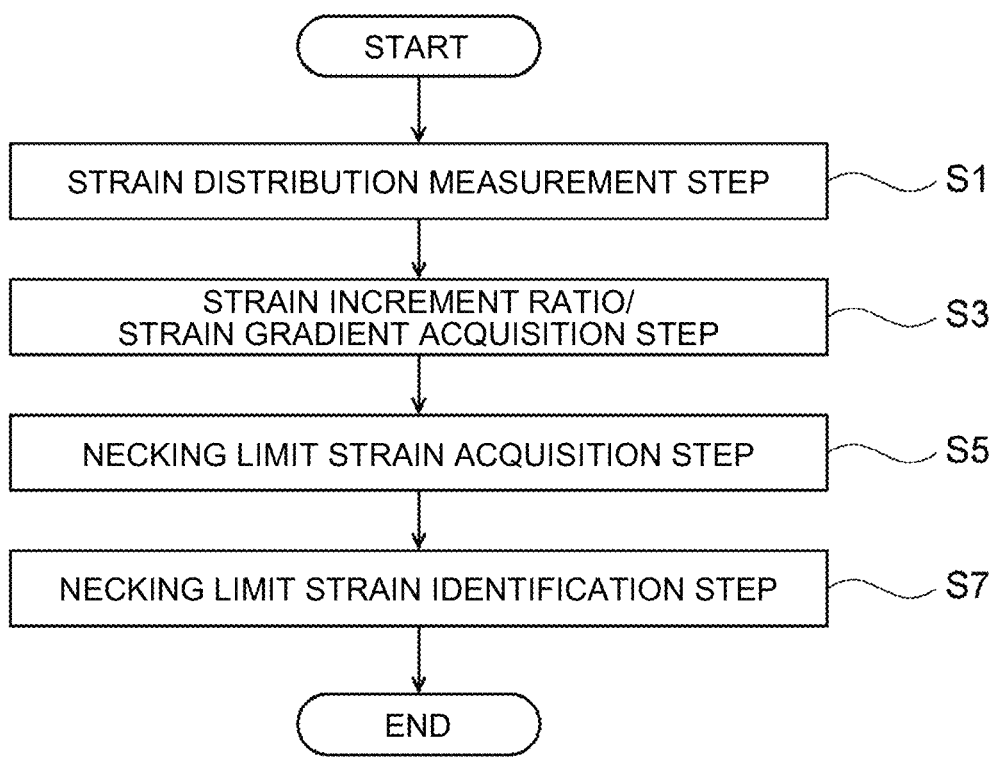
FIG. 1 is a flow diagram illustrating a process flow in a method for identifying a necking limit strain of a metal sheet according to an embodiment of the present invention.
Figure 2:
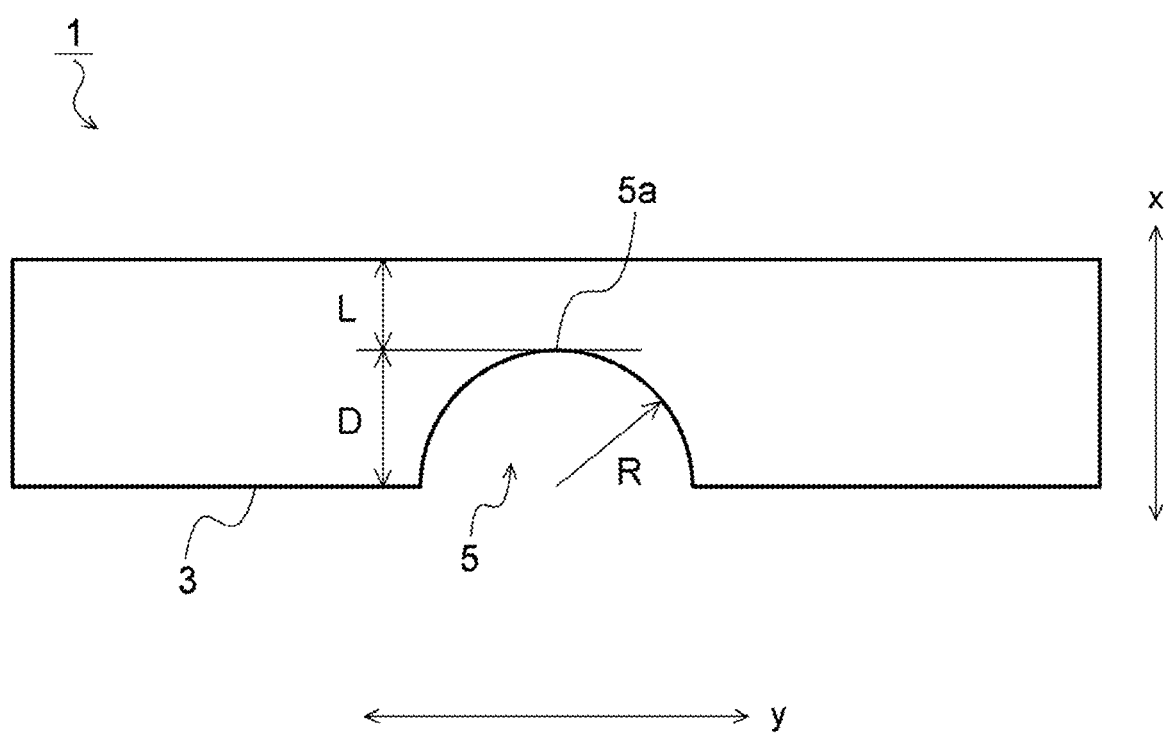
FIG. 2 is a diagram for explaining a sheet specimen used in the embodiment of the present invention.

A method for identifying a necking limit strain of a metal sheet according to an embodiment of the present invention is a method that identifies the necking limit strain at which necking occurs at a notch root 5a of a sheet specimen 1 of the metal sheet by imparting tensile deformation as illustrated in FIG. 2 as an example. As illustrated in FIG. 1, the method for identifying a necking limit strain of a metal sheet according to the embodiment of the present invention includes a strain distribution measurement step S1, a strain increment ratio/strain gradient acquisition step S3, a necking limit strain acquisition step S5, and a necking limit strain identification step S7. Each of the above-described processes will be described below.

Strain Distribution Measurement Step

The strain distribution measurement step S1 is a step of measuring, on each of two or more types of sheet specimens 1 having a notch geometry 5 for which a portion of a sheet edge 3 is notched inward as illustrated in FIG. 2 and having a different strain gradient of a notch root 5a in the tensile orthogonal direction (x-direction in FIG. 2) that is orthogonal to the tensile direction (y-direction in FIG. 2) when tensile deformation is imparted, the distribution of strain in the tensile orthogonal direction in a tensile deformation process in which necking is caused in the notch root 5a by imparting the tensile deformation.

At the strain distribution measurement step S1, two or more types of sheet specimens 1 having the notch geometry 5 in which a portion of the sheet edge 3 is notched inward in a semicircular shape and in which a notch radius R of the notch geometry 5 and/or the distance from the notch root 5a to the sheet edge 3 on the opposite side (ligament length L) is different so that the strain gradient of the notch root 5a illustrated in FIG. 2 is different are used.

The notch radius R and the ligament length L of the notch geometry 5 are factors that affect the strain gradient produced at the notch root 5a by imparting tensile deformation. By changing the notch radius R and/or the ligament length L, the strain gradient when tensile deformation is imparted to the notch root 5a can be made different. Specifically, as the notch radius R is smaller or the ligament length L is shorter, the strain gradient is larger.

The suitable dimensions of the notch geometry 5 formed in the sheet specimen 1 are a notch radius R of greater than or equal to 0 mm but less than or equal to 500 mm and a ligament length L of greater than or equal to 1 mm but less than or equal to 500 mm (below the maximum width of the sheet specimen 1). If the notch geometry 5 exceeds the upper limits of these dimensions, a huge tensile testing machine is needed to impart tensile deformation to the notch root 5a in order to cause necking, which is not practical and therefore undesirable. It is further preferable that the notch radius R be greater than or equal to 1 mm but less than or equal to 450 mm and the ligament length L be greater than or equal to 1 mm but less than or equal to 450 mm.

Then, in the present embodiment, for each of the two or more types of sheet specimens 1 in which the notch geometry 5 is formed so that the strain gradient is different as in the foregoing, the tensile deformation is imparted to the notch root 5a by a tensile testing machine that applies a tensile load in a uniaxial direction in the plane of the sheet specimen 1.

The strains to be obtained at the strain distribution measurement step S1 are a maximum principal strain $\varepsilon_1$ which is the strain in the tensile direction (y-direction in FIG. 3, longitudinal direction), and a minimum principal strain $\varepsilon_2$ which is the strain in the tensile orthogonal direction (x-direction in FIG. 3, width direction).

The distribution of the maximum principal strain $\varepsilon_1$ and the minimum principal strain $\varepsilon_2$ in the tensile orthogonal direction only needs to be measured at predetermined time steps during tensile deformation for the range including the notch root 5a by, for example, an image correlation (DIC: Digital Image Correlation) method. When measuring the strain distribution by the image correlation method, the sheet specimen 1 for which lines or dots are printed on the surface at predetermined intervals or the sheet specimen 1 for which fine irregularities are formed on the surface at predetermined intervals only needs to be used. In the image correlation method, a camera is placed to capture images of the surface of the sheet specimen 1 including the notch geometry 5, the deformation of the notch geometry 5 during the process of imparting tensile deformation to the notch root 5a is captured, and image analysis is performed, thereby obtaining the respective distributions of the maximum principal strain $\varepsilon_1$ and the minimum principal strain $\varepsilon_2$.

However, the strain distribution measurement step S1 is not limited to measuring the strain distribution by the image correlation method and may also measure the strain distribution in the tensile orthogonal direction from the notch root 5a in predetermined time steps by attaching a strain gauge to the surface of the sheet specimen 1 along the tensile orthogonal direction.

At the strain distribution measurement step S1, as the strain rate when press forming is performed in an actual press machine is in the range of 0.01/sec to 1/sec, it is preferable that the strain rate of tensile deformation that is imparted to the notch root 5a be set to be in the range of 0.01/sec to 1/sec.

Strain Increment Ratio/Strain Gradient Acquisition Step

The strain increment ratio/strain gradient acquisition step S3 is a step of obtaining, for each of the two or more types of sheet specimens 1, the strain increment ratio of the notch root 5a and the strain gradient in the tensile orthogonal direction during the tensile deformation process from the strain distribution measured at the strain distribution measurement step S1.

The strain increment ratio $r_{edge}$ was defined by the following Expression (1) by referring to the "plastic strain ratio" (ratio of logarithmic strain in width direction $\varepsilon_2$ to logarithmic strain in thickness direction $\varepsilon_3$) specified in JIS 2254 (2008) and others, and by using the constant volume condition [logarithmic strain in thickness direction $\varepsilon_3$=(logarithmic strain in longitudinal direction $\varepsilon_1$+logarithmic strain in width direction $\varepsilon_2$)].

$$r_{edge} = -\frac{d\varepsilon_2}{d\varepsilon_1 + d\varepsilon_2} \quad (1)$$

In Expression (1), $d\varepsilon_1$ and $d\varepsilon_2$ indicate the unit time increments of the maximum principal strain $\varepsilon_1$ (logarithmic strain in the longitudinal direction (tensile direction) of the sheet specimen 1) and the minimum principal strain $\varepsilon_2$ (logarithmic strain in the width direction (tensile orthogonal direction) of the sheet specimen 1), respectively, at the strain concentration portion (notch root 5a) in the notch geometry 5 of the sheet edge 3.

Meanwhile, the strain gradient $d\varepsilon/dx$ is defined as the slope in the tensile orthogonal direction of the maximum principal strain $\varepsilon_1$ at the notch root 5a and is obtained from the distribution of the strain in the tensile orthogonal direction measured at the strain distribution measurement step S1.

The strain gradient only needs to be obtained, for example, by dividing the difference between the strain at the notch root 5a and the strain at a predetermined distance (1 to 100 mm) in the tensile orthogonal direction from the notch root 5a by the relevant predetermined distance.

Necking Limit Strain Acquisition Step.

The necking limit strain acquisition step S5 is a step of obtaining, for each of the two or more types of sheet specimens 1, the strain at the time of occurrence of necking in the notch root 5a as the necking limit strain based on the strain increment ratio $r_{edge}$ obtained at the strain increment ratio/strain gradient acquisition step S3.

The reason for obtaining the necking limit strain based on the strain increment ratio $r_{edge}$ is as follows. When a tensile load in the in-plane uniaxial direction (y-direction in FIG. 2) is imparted to the sheet specimen 1, the deformation of the sheet edge 3 is in a uniaxial tensile condition as there is no constraint in the width direction (x-direction in FIG. 2). Therefore, the strain increment ratio $r_{edge}$ coincides with the r-value in the tensile direction before the occurrence of necking in the sheet edge 3. That is, from the logarithmic strain in thickness direction $\varepsilon_3$ of the sheet specimen 1, there is a relation $r=\varepsilon_2/\varepsilon_3=-\varepsilon_2/(\varepsilon_1+\varepsilon_2)$, which is consistent with the $r_{edge}$ in Expression (1). However, after the occurrence of necking, the tensile deformation is concentrated in the necking that occurred in the notch root 5a, so that the maximum principal strain $\varepsilon_1$ expressed in Expression (1) becomes larger and the minimum principal strain $\varepsilon_2$ becomes smaller and thus the strain increment ratio $r_{edge}$ at the position where the necking occurred becomes smaller than the r-value.

Therefore, in the present invention, such a characteristic of the strain increment ratio is utilized to assume that the necking has occurred in the notch root 5a at the point where the strain increment ratio $r_{edge}$ deviates from the r-value in the tensile direction during the tensile deformation process, and the strain at the point of relevant deviation is obtained as the necking limit strain.

Figure 4:
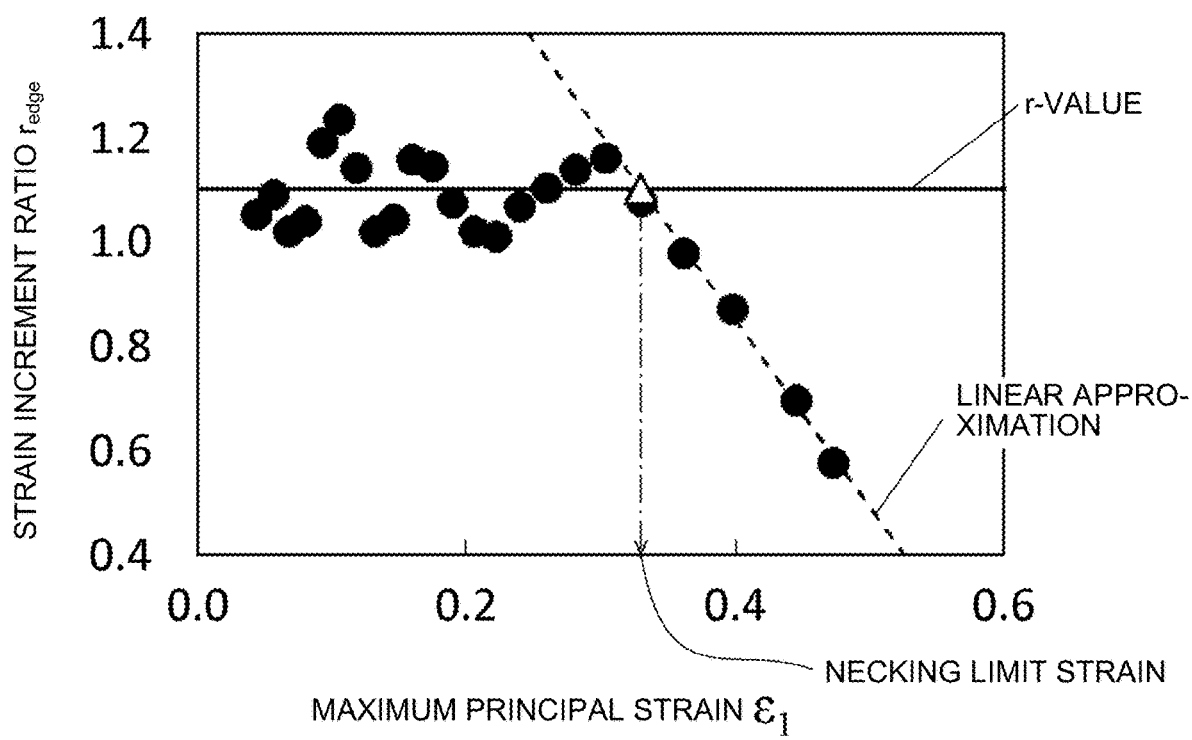
FIG. 4 is a diagram for explaining an example of a method for obtaining the necking limit strain in the embodiment of the present invention.

Then, in the present embodiment, as illustrated in FIG. 4, the relation between the strain increment ratio $r_{edge}$ and the maximum principal strain after the occurrence of necking is linearly approximated, and the maximum principal strain at the intersection between the relevant approximation straight line and the r-value in the tensile direction is taken as the necking limit strain.

The present invention is not limited to the above-described method, and the method may use a certain index that identifies the deviation between the strain increment ratio $r_{edge}$ and the r-value. For example, when the ratio of the strain increment ratio $r_{edge}$ to the r-value is used as an index, the maximum principal strain at the time when the relevant index becomes a predetermined value or less, for example, below 1, only needs to be taken as the necking limit strain.

Necking Limit Strain Identification Step

The necking limit strain identification step S7 is a step of identifying the necking limit strain as a function of strain gradient from the relation between the necking limit strain obtained for the two or more types of sheet specimens 1 and the strain gradient at the time of the necking limit strain in the tensile deformation process.

Figure 5:
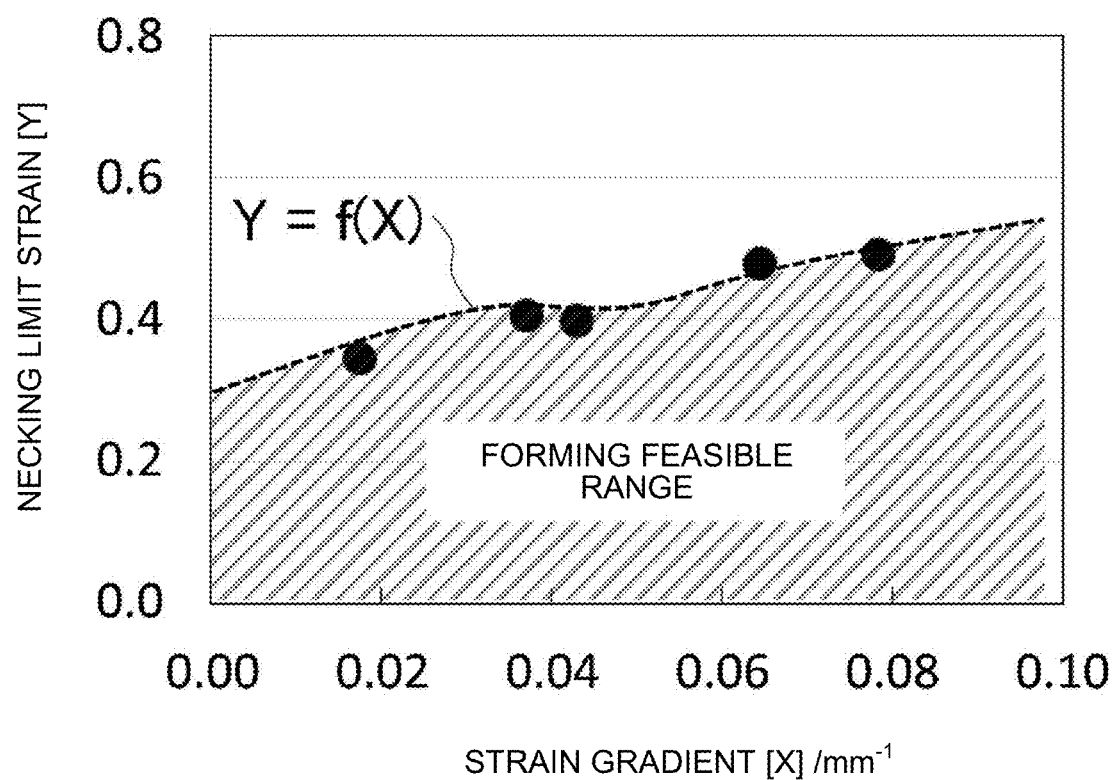
FIG. 5 is a graph indicating a relation between the necking limit strain and the strain gradient obtained for two or more types of sheet specimens in the embodiment of the present invention.
Figure 6:
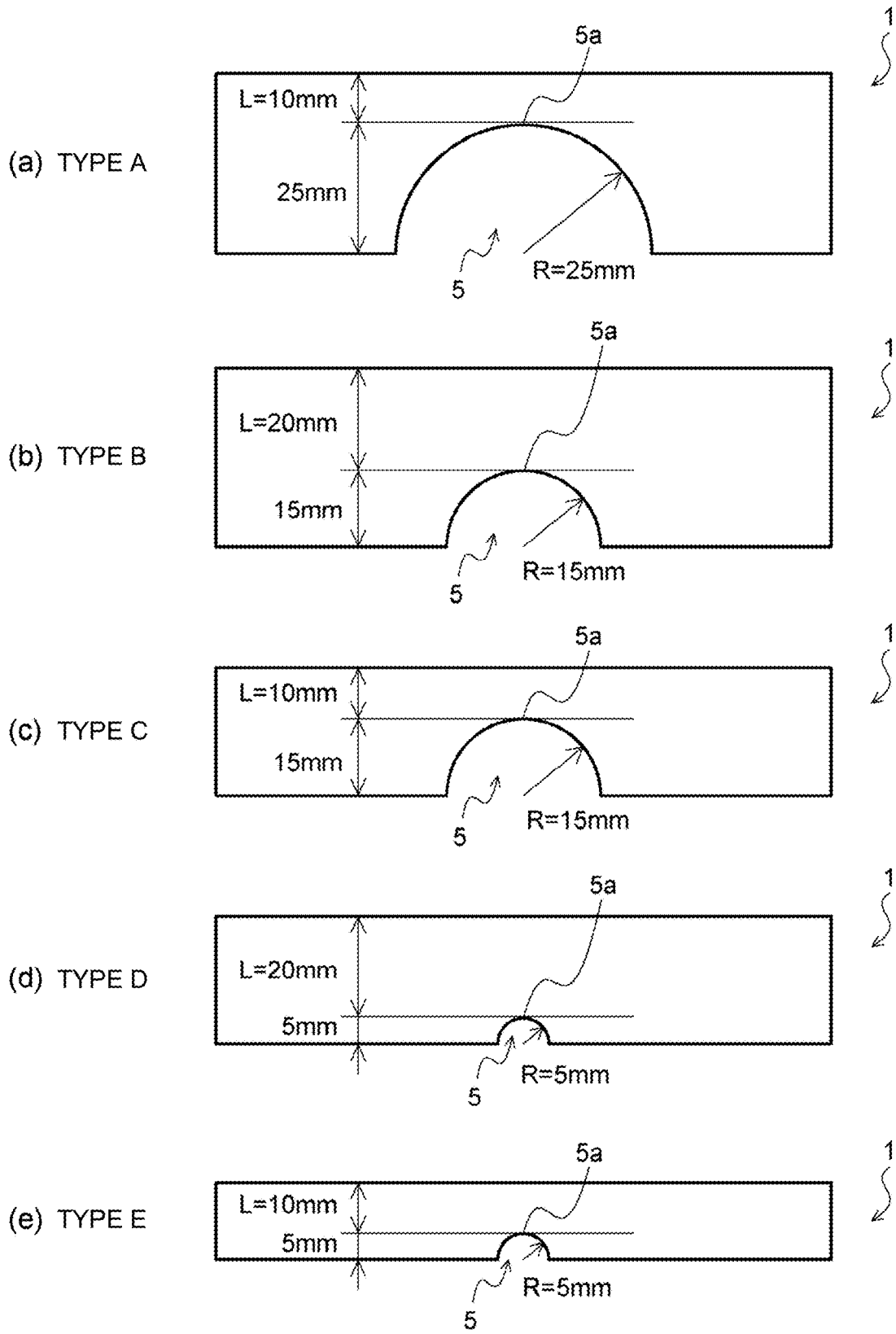
FIG. 6 is a diagram illustrating sheet specimens having different notch geometry used in the embodiment and an example.

As an example, FIG. 5 illustrates a graph for which the necking limit strain obtained for five types of sheet specimens 1 (type A through type E) illustrated in FIG. 6 and the strain gradient at the time when the notch root 5a in each sheet specimen 1 is at the necking limit strain during the tensile deformation process are plotted.

The sheet specimens 1 illustrated in FIG. 6 all have the semicircular notch geometry 5 in the sheet edge 3, and the notch radius R and/or the ligament length L of the notch geometry 5 is changed so that the strain gradient in the tensile orthogonal direction from the notch root 5a inward is different.

Then, as illustrated in FIG. 5, based on the relation between the necking limit strain (ordinate axis in the graph) and the strain gradient (abscissa axis in the graph) obtained for the two or more types of sheet specimens 1, the necking limit strain [Y] can be identified by the function of the strain gradient [X] in Y=f(X).

In the graph illustrated in FIG. 5, the range below the necking limit strain [Y] identified as the function of the strain gradient [X] (the shaded area in FIG. 5) indicates a press formable range in which press forming can be performed without causing necking.

Then, for example, before performing actual press forming, a press forming simulation of a press forming product accompanied with stretch flanging is performed by a finite element method, and by applying the strain $\varepsilon_{FEM}$ and the strain gradient $d\varepsilon/dx_{FEM}$ calculated by FEM analysis to the graph of the necking limit strain and the strain gradient in FIG. 5, it is possible to make a judgement whether press forming is feasible without causing necking.

Specifically, the strain $\varepsilon_{FEM}$ obtained by the FEM analysis is compared with the value $f(d\varepsilon/dx_{FEM})$ obtained by substituting the strain gradient $d\varepsilon/dx_{FEM}$ [X] at the position where the relevant strain was obtained into the evaluation function f(X) of the necking limit strain [Y]. Then, it can be judged that forming is feasible as necking does not occur if $\varepsilon_{FEM} < f(d\varepsilon/dx_{FEM})$, and that forming is not feasible as the necking occurs if $\varepsilon_{FEM} > f(d\varepsilon/dx_{FEM})$.

As in the foregoing, according to the method for identifying a necking limit strain of a metal sheet in the present embodiment, the necking limit strain that causes necking due to tensile deformation imparted to the sheet edge of the metal sheet can be identified easily and accurately, without the need of a plurality of dedicated tools and test devices.

In addition, according to the method for identifying a necking limit strain of a metal sheet in the present embodiment, based on the analysis result of the press forming simulation of the press forming product accompanied with stretch flanging, it is possible to predict the presence of occurrence of necking at a site subjected to stretch flanging and to deal with before leading to the fracture. It is also possible to prevent the fracture due to variations and the like in disturbances during the mass production stage of the relevant press forming product.

Figure 7:
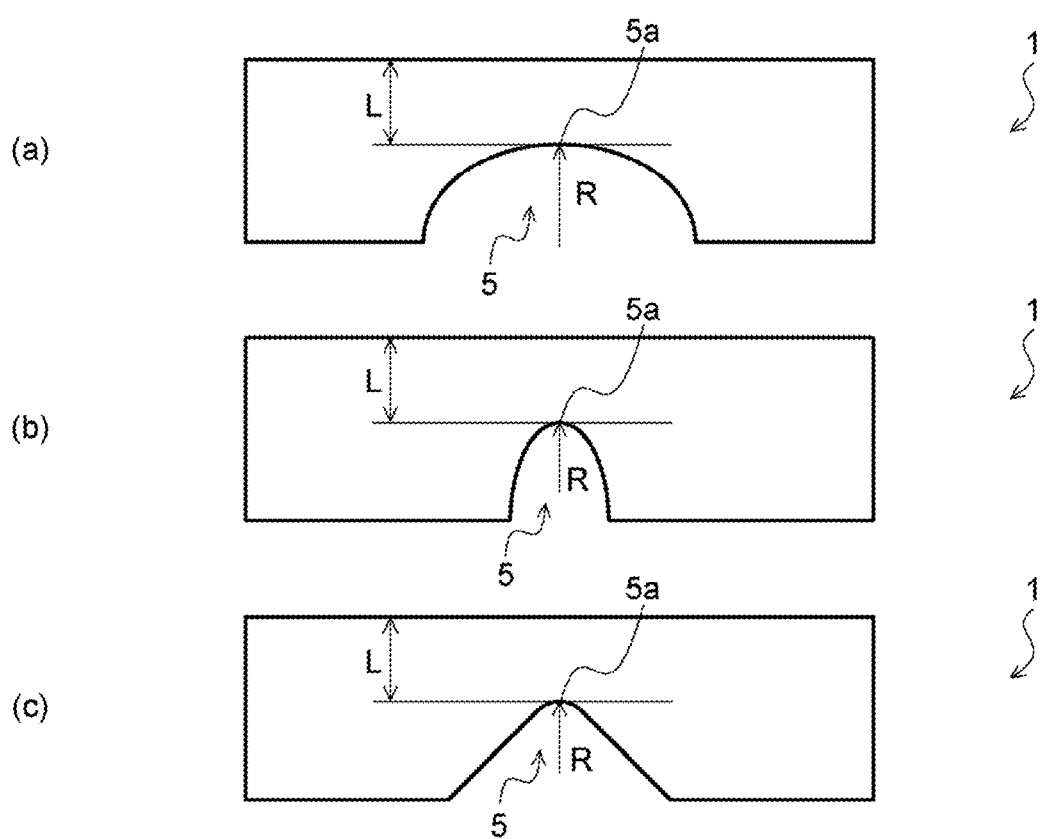
FIG. 7 is a diagram for explaining specific examples of the notch geometry formed in the sheet specimens used in the present invention.

In the above description, the notch geometry 5 formed in the sheet specimen 1 has been semicircular as illustrated in FIG. 2. However, it is not limited to the notch geometry 5, and it may be a horizontally long semi-elliptical shape in which the short axis side is notched inward as illustrated in FIG. 7(a), a vertically long semi-elliptical shape in which the long axis side is notched inward as illustrated in FIG. 7(b), or a substantially triangular shape in which one apex located inside is rounded with a predetermined notch radius R as illustrated in FIG. 7(c), for example. It may be any shape as long as it can cause necking by imparting tensile deformation to the notch root 5a and can change the strain gradient in the notch root 5a.

Furthermore, in the foregoing description, tensile deformation has been imparted to the notch root 5a by applying a tensile load in the in-plane uniaxial direction of the sheet specimen 1 using a uniaxial tensile testing machine, but the method of imparting the tensile deformation is not limited thereto. It may be a method in which the sheet edge on the side having the notch root 5a is supported by two or more points across the notch root 5a, the sheet edge on the opposite side of the notch root 5a is pressed, and a load that results in bending deformation in the plane of the sheet specimen 1 is applied, thereby imparting local tensile deformation to the notch root 5a.

In the present invention, the sheet specimen only needs to be a metal sheet, and specific examples thereof include a steel sheet, aluminum alloy sheet, magnesium alloy sheet, titanium alloy sheet, and the like. There are no restrictions on the material strength of the sheet specimen 1.

Moreover, the occurrence of necking when tensile deformation is imparted to the sheet edge of a sheet specimen, at the notch root 5a, is affected by the end face properties of the metal sheet due to differences in processing at the time of producing the sheet specimens such as piercing or shearing. Therefore, in the present invention, it is preferable to use a sheet specimen that has been fabricated so that the end face properties of the notch root 5a are the same by processing such as piercing or shearing in the same manner as blanks provided for press forming of actual press forming products.

Although the above description has been intended to identify the necking limit strain at which the necking occurs subjected to stretch flanging, the present invention may also target identifying the necking limit strain of the necking that occurs at the hole edge formed in a burring process.

EXAMPLE

Verifications for confirming the action and effect of the method for identifying a necking limit strain of a metal sheet according to the present invention were conducted, and the following describes that.

Identification of Necking Limit Strain

In the example, first, using sheet specimens 1 fabricated from two steel sheets having different tensile strengths (steel grade α: sheet thickness of 1.2 mm and tensile strength of 590 MPa class, steel grade sheet thick of 1.2 mm and tensile strength of 1180 MPa class) as a metal sheet, the necking limit strain was identified for each of the steel grade α and the steel grade β.

In the experiment, a plurality of sheet specimens 1 illustrated in FIG. 6 were fabricated for each steel grade (type A through type E), and the distribution of the strain in the tensile orthogonal direction during the tensile deformation process that causes necking in the notch root 5a of the sheet specimen 1 was measured at predetermined time steps by the image correlation method.

Next, from the measurement results of the distribution of the strain in the tensile orthogonal direction in the tensile deformation process, the strain gradient and the necking limit strain at the time of occurrence of necking in the notch root 5a were obtained. Table 1 indicates the results of the strain gradient and the necking limit strain obtained for each of the five types of sheet specimens 1 fabricated from the steel grade α. Table 2 indicates the results of the strain gradient and the necking limit strain obtained for each of the three types of sheet specimens 1 fabricated from the steel grade β. The strain gradients indicated in Table 1 and Table 2 were calculated by dividing the difference between the strain at the notch root 5a of the notch geometry 5 and the strain at a distance of 5 mm inward from the notch root 5a in the tensile orthogonal direction by the distance thereof.

TABLE 1

| Sheet specimen [steel grade α] (FIG. 6) | Strain gradient | Necking limit strain |
| --- | --- | --- |
| Type A | 0.0274 | 0.306 |
| Type B | 0.0369 | 0.438 |
| Type C | 0.0428 | 0.401 |
| Type D | 0.0642 | 0.480 |
| Type E | 0.0732 | 0.462 |

TABLE 2

| Sheet specimen [steel grade β] (FIG. 6) | Strain gradient | Necking limit strain |
| --- | --- | --- |
| Type B | 0.0205 | 0.158 |
| Type D | 0.0163 | 0.113 |
| Type E | 0.0390 | 0.230 |

Subsequently, for each of the steel grade α and the steel grade β, from the relation between the necking limit strain and the strain gradient obtained for the sheet specimens 1, the necking limit strain [Y] was identified by the function of the strain gradient [X] at the notch root 5a in Y=f(X). In this case, from the linear approximation of the strain gradient and the necking limit strain, the evaluation function for the strain gradient [X] that imparts necking limit strain [Y] was defined as f(X)=aX+b, and the values of the parameters a and b were obtained.

Figure 8:
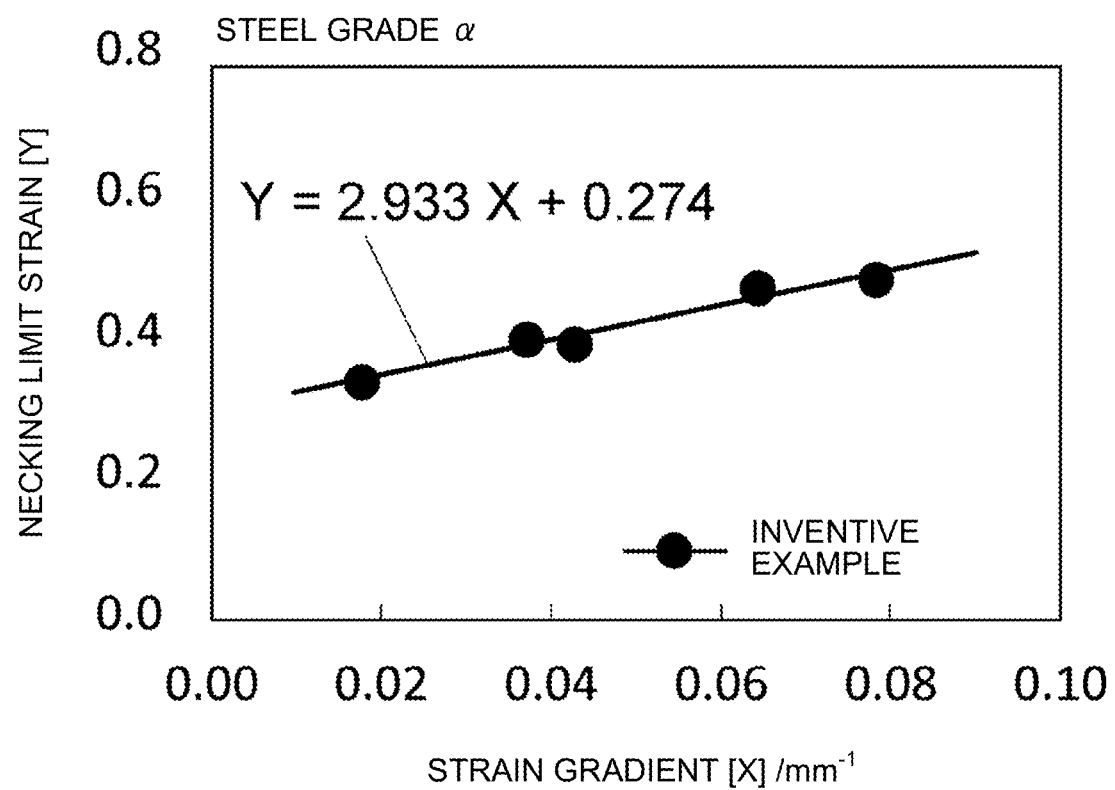
FIG. 8 is a graph indicating the relation between the necking limit strain and the strain gradient identified for steel grade α in the example.
Figure 9:
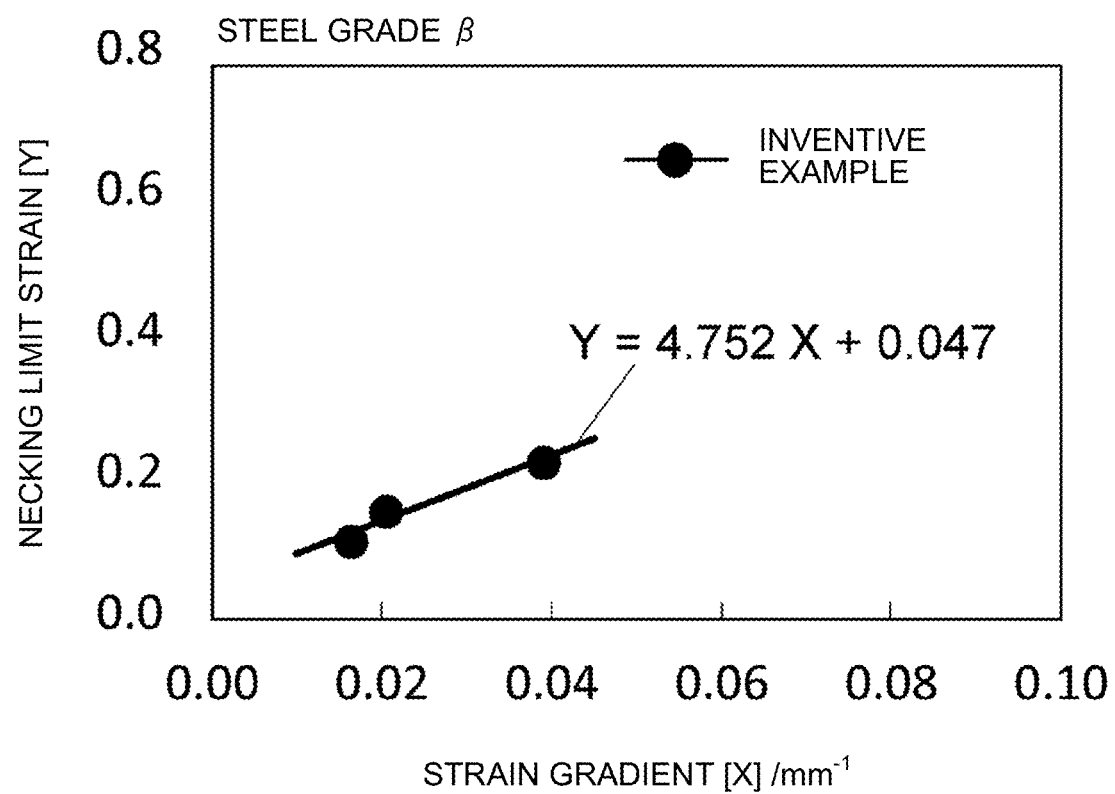
FIG. 9 is a graph indicating the relation between the necking limit strain and the strain gradient identified for steel grade β in the example.

FIG. 8 and FIG. 9 indicate the results for which the relation between the necking limit strain and the strain gradient obtained for each of the steel grade α and the steel grade β was plotted and the evaluation function f(X) in which the parameters a and b obtained from the relation between the necking limit strain and the strain gradient were given was stated.

When the relation between the necking limit strain Y and the strain gradient X identified by the present invention is approximated by the evaluation function f(X)=aX+b, Y=2.933X+0.274 for the steel grade α and Y=4.752X+0.047 for the steel grade R, and it can be found that the strain gradient can be used to identify the necking limit strain in both steel grades.

In FIG. 8 and FIG. 9, by defining the evaluation function f(X) that identifies the necking limit strain to be a linear function of the strain gradient f(X)=aX+b, and by linearly approximating the relation between the necking limit strain [Y] and the strain gradient [X] obtained for the two or more types of sheet specimens, the parameters a and b in the evaluation function f(X)=aX+b were determined. However, the present invention does not limit the evaluation function f(X) that identifies the necking limit strain to the linear function f(X)=aX+b as in the foregoing, and a certain function can be used for the evaluation function f(X) that identifies the necking limit strain.

Judgement of Press Forming Feasibility

Figure 10:
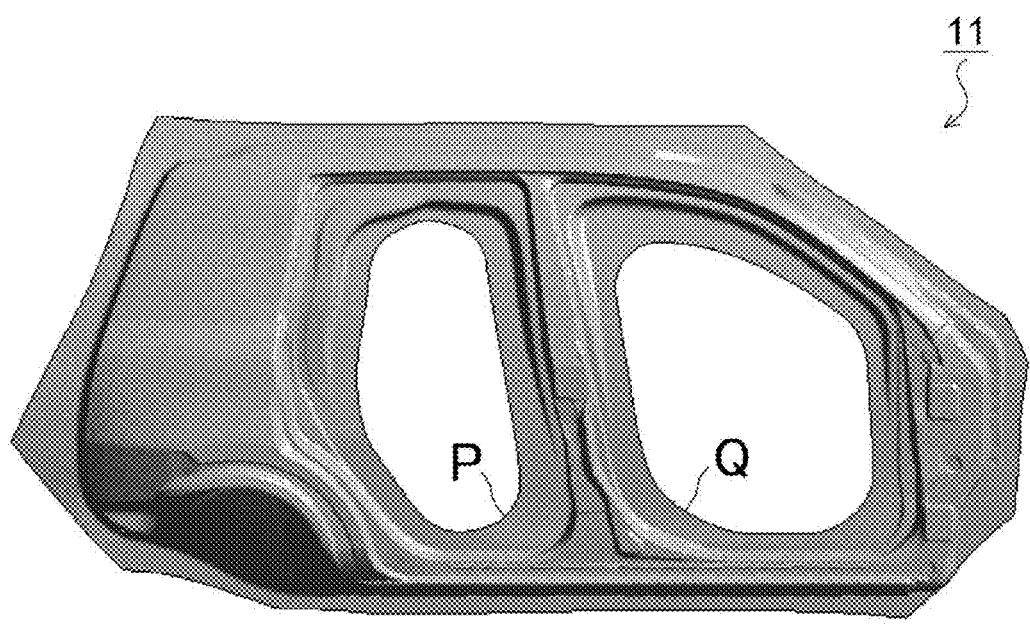
FIG. 10 is a plan view of a press forming product as a judgement target of press forming feasibility based on the necking limit strain identified by the present invention in the example.

Next, the necking limit strain on a stretch flanging portion of a press forming product 11 illustrated in FIG. 10 (site P and site Q in FIG. 10) was identified by the present invention, and based on the relevant identified necking limit strain, the press forming feasibility was judged. Note that in the actual press forming, a fracture occurred in the site P, while the site Q was formed normally.

First, by the FEM analysis for which the metal sheet (steel grade α) is press-formed into the press forming product 11, the maximum principal strain and the strain gradient in the tensile orthogonal direction at the site P and the site Q that were subjected to stretch flanging were obtained. Then, the relevant obtained strain gradient X was substituted into the foregoing evaluation function f(X)=aX+b of the necking limit strain, and the necking limit strain Y=f(X) was calculated.

Figure 11:
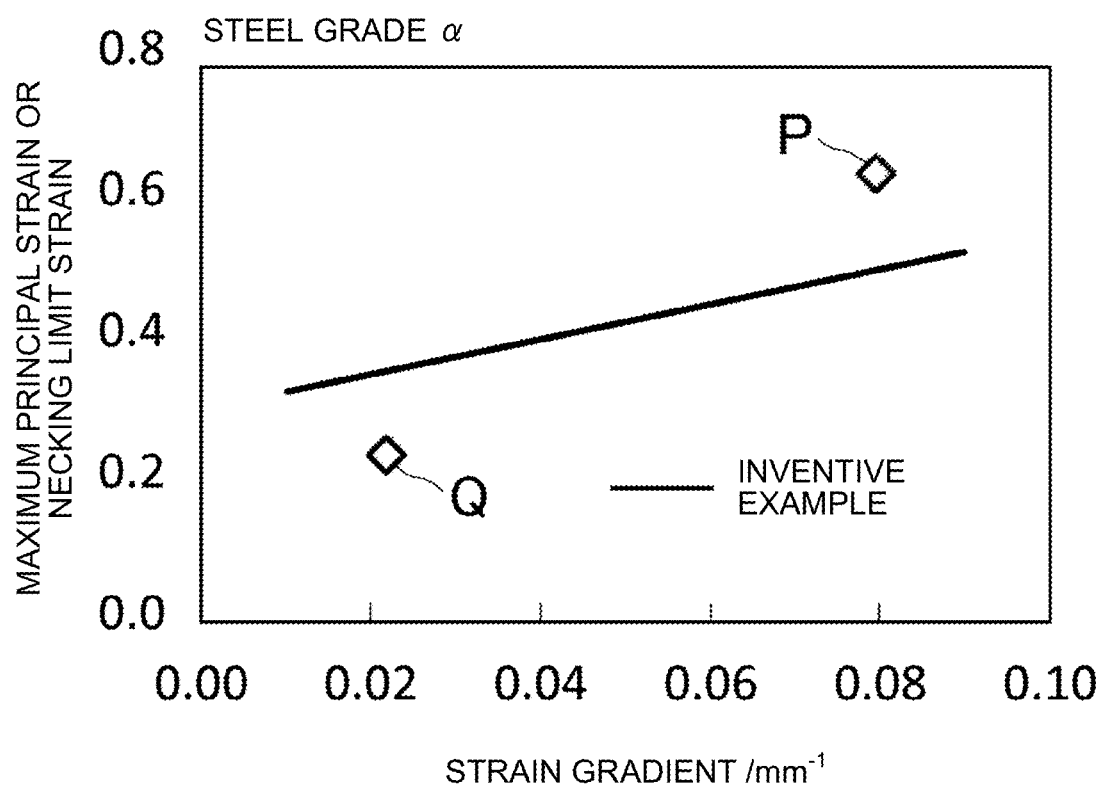
FIG. 11 is a graph indicating the relation between the necking limit strain and the strain gradient identified by the present invention in the example and the necking limit strain of the sites subjected to stretch flanging in the press forming product.

FIG. 11 indicates the evaluation function (solid line in FIG. 11) of the necking limit strain identified on the steel grade α described as an inventive example in the foregoing, the strain gradient obtained in the same manner as those in Table 1 and Table 2 from the strain distribution in the in-plane direction extending from the sheet edge portion toward the bottom portion of the stretch flanging dent in the site P and the site Q obtained by the FEM analysis of the press forming product 11, and the maximum principal strain (◇ marks in FIG. 11) corresponding thereto.

The strain gradients were calculated by dividing the difference between the strain at the notch root 5a and the strain at a distance of 5 mm inward from the notch root 5a in the tensile orthogonal direction by the distance thereof. Table 3 collectively indicates the maximum principal strain $\varepsilon_{FEM}$ at the site P and the site Q, the strain gradient $d\varepsilon/dx_{FEM}$ calculated using the difference between the strain at the notch root 5a and the strain at the position 5 mm inward in the tensile direction from the notch root 5a, the necking limit strain $f(d\varepsilon/dx_{FEM})$ calculated by giving the strain gradient $d\varepsilon/dx_{FEM}$, and the results for which the press forming feasibility was judged by the relevant obtained necking limit strain.

TABLE 3

| Evaluation site | P | Q |
| --- | --- | --- |
| Maximum principal strain $\varepsilon_{FEM}$ | 0.646 | 0.24 |
| Strain gradient $d\varepsilon/dx_{FEM}$ | 0.0795 | 0.0219 |
| Necking limit strain $f(d\varepsilon/dx_{FEM})$ | 0.505 | 0.36 |
| Forming feasibility judgement result | Not feasible | Feasible |

From the inventive examples illustrated in FIG. 11 and Table 3, at the site P (strain gradient 0.0795), the maximum principal strain ($\varepsilon_{FEM}$=0.646) obtained by the FEM analysis of the press forming product 11 was of a value greater than the necking limit strain ($f(d\varepsilon/dx_{FEM})$=0.505), so it was judged that forming was not feasible. Meanwhile, at the site Q (strain gradient 0.0219), the maximum principal strain ($\varepsilon_{FEM}$=0.24) obtained by the FEM analysis of the press forming product 11 was of a value smaller than the necking limit strain ($f(d\varepsilon/dx_{FEM})$=0.36), so it was judged that forming was feasible.

As in the foregoing, it has been illustrated that the present invention can, on press forming products having a site subjected to stretch flanging, based on the necking limit strain identified using strain gradient, make a judgement of press forming feasibility.

INDUSTRIAL APPLICABILITY

According to the present invention, it is possible to provide a method for identifying a necking limit strain of a metal sheet that is capable of identifying necking limit strain at the time when necking occurred at the sheet edge of the metal sheet in press forming accompanied with stretch flanging easily and accurately, and capable of predicting the occurrence of fracture in advance during the mass production.

REFERENCE SIGNS LIST

1 SHEET SPECIMEN
3 SHEET EDGE
5 NOTCH GEOMETRY
5a NOTCH ROOT
7 STRAIN CONCENTRATION PORTION
11 PRESS FORMING PRODUCT

The invention claimed is:

1. A method for identifying a necking limit strain of a metal sheet, the method identifying a relation between a necking limit strain, at which necking occurs at a sheet edge of a metal sheet by imparting tensile deformation, and a strain gradient, and the method comprising:
 a strain distribution measurement step of measuring, for two or more types of sheet specimens having a notch geometry for which a portion of a sheet edge is notched inward and having a different strain gradient in a tensile orthogonal direction that is orthogonal to a tensile direction when tensile deformation is imparted to a notch root of the notch geometry, distribution of strain of the notch root in the tensile orthogonal direction in a tensile deformation process;
 a strain increment ratio/strain gradient acquisition step of obtaining, for each of the sheet specimens, a strain increment ratio of the notch root in the tensile deformation process and a strain gradient in the tensile orthogonal direction, from the distribution of the strain in the tensile orthogonal direction measured at the strain distribution measurement step;
 a necking limit strain acquisition step of obtaining, for each of the sheet specimens, a necking limit strain that is a strain at a time of occurrence of necking in the notch root based on the strain increment ratio in the tensile deformation process obtained at the strain increment ratio/strain gradient acquisition step; and
 a necking limit strain identification step of identifying the necking limit strain as a function of the strain gradient from a relation between the necking limit strain obtained for each of the sheet specimens and the strain gradient at a time of the necking limit strain out of the strain gradients in the tensile deformation process obtained at the strain increment ratio/strain gradient acquisition step.

2. The method for identifying a necking limit strain of a metal sheet according to claim 1, wherein the strain distribution measurement step imparts tensile deformation to the notch root by applying a tensile load in a uniaxial direction to the sheet specimen.

3. The method for identifying a necking limit strain of a metal sheet according to claim 1, wherein the strain distribution measurement step measures the distribution of the strain in the tensile orthogonal direction by an image correlation method.

4. The method for identifying a necking limit strain of a metal sheet according to claim 2, wherein the strain distribution measurement step measures the distribution of the strain in the tensile orthogonal direction by an image correlation method.

* * * * *